Patented Oct. 10, 1950

2,525,214

UNITED STATES PATENT OFFICE 2,525,214

MICROBIOLOGICAL PROCESSES

Sigvard Frans August Ekelund,
Halmstad, Sweden

No Drawing. Application July 9, 1947, Serial No. 759,907. In Sweden February 6, 1945

8 Claims. (Cl. 195—28)

The present invention relates to a method to be used in connection with a microbiological processing of dissolved raw-materials, e. g. by means of fermentation, in order to effect a higher purity and/or increased concentration of products formed in the solution, whereby the costs for their subsequent purification or concentration may be considerably reduced and the technical equipment needed for these operations simplified.

According to the invention, a substance consisting of or containing active micro-organisms, such as yeast, is caused to sorp (by which generally accepted term is understood processes involving absorption and/or adsorption) from a solution (in the following called the "raw-material solution") such material contained therein which is to be processed (the "raw-material"), after which said sorping substance, before it has begun to give off products formed in the microbiological process to any material degree, is transferred to another operating medium which is chiefly free from said raw-material, for instance a solution only containing nutritional salts, in which the microbiological process is allowed to proceed with formation of the desired products by a conversion of the raw-material thus derived from the original "raw-material solution."

A suitable way of carrying out the process is to separate the substance, consisting of or comprising the processing micro-organisms in question with its sorped (absorbed and/or adsorbed) raw-material, from the raw-material solution by means of, e. g. centrifugation, when the sorping procedure has taken place to a certain degree but before any material transformation of said raw-material by the microbiological process has yet had time to take place, the separated substance being transferred to the other operating medium in which said microbiological process is allowed to proceed with the desired transformation of the raw-material sorped therein.

It is also possible from the outset to keep the sorping substance, for instance a sludge of yeast, and the raw-material solution separated by a porous wall through which they are brought in contact, preferably while kept in circulation, whereby the yeast is able to take up the substance (e. g. sugar) which is to be transformed. Immediately upon having sufficiently taken up this, the yeast (or other sorping substance used) is then introduced into the second operating medium as already described without the necessity of being first passed through a centrifuge.

According to the invention the process may suitably be carried out so that the concentration of micro-organisms is higher in the second operating medium. This may suitably consist of a liquid medium of higher purity than the original raw-material solution. By these expedients the transformation products are thus in a simple way obtained in a higher concentration and/or of higher purity than if they were formed in the original medium.

Although in no way limited to a certain field of manufacture the invention is particularly suited for a microbiological processing of highly diluted or impure raw-material solutions, such as waste sulfite liquor, whey and the like, which are for instance processed for obtaining alcohol or lactic acid. Even in cases when the raw-material solution may be comparatively concentrated, the process is still advantageously used when the solution is impure, just as it offers advantages in processing pure solutions having a low concentration, as ought to be evident without further explanation.

In processing a waste sulfite liquor which has been suitably prepared in a manner known per se, it may for instance according to the invention be proceeded in such a way that the liquor is treated with a sufficient amount of yeast to effect a sorping of the main quantity of fermentable sugar in the solution, whereupon the yeast, before any material emitting of alcohol has begun from the same, is separated from the liquor, suitably by centrifugation, and transferred to a solution preferably only containing nutritional salts for the yeast, said solution having preferably such a limited volume that the concentration of the alcohol produced therein by the continued fermentation process will approach the highest concentration which the yeast is optimally capable of producing.

As an example of a suitable procedure may be mentioned that by selecting a favorable operating temperature, e. g. 40°–50° C., it is possible in such a short time as 20 minutes or less to effect a practically complete sorption of the fermentable sugar from a sugar solution of even a very low concentration, such as for instance waste sulfite liquor, provided that a sufficient quantity of yeast is employed. By a subsequent quick separation of the yeast from said solution, e. g. by means of running this through a centrifuge and immediately transferring the yeast to a comparatively small quantity of a solution of nutritional salts having an optimum temperature of fermentation (about 30° C.) it is possible, by properly adjusting the volume of said solution to the amount of yeast, to reach the highest concentration of alcohol which the yeast will under any circumstance be capable of producing in said medium. Such a process of fermentation normally takes 7–32 hours but may of course vary depending on different factors involved in the common processes of technical fermentation.

It is thus, by means of the invention, possible in the manufacture of alcohol from waste sulfite liquor, using a raw-material solution with only 2–4 per cent of fermentable sugar, to produce an alcohol solution without distillation having a concentration as if it were produced from a mash rich in sugar, which entails a considerable saving in steam in the following distillation. In addition it is always, whether the raw-material solution is highly diluted or not, possible in the processing of impure sugar solutions to obtain a more pure end-product in the fermenting step, which of course simplifies the subsequent distillation.

The same advantages may, as already mentioned, be obtained by applying the above outlined principles of invention to other microbiological processes which are terminated by a distillation or evaporation of the solution containing the produced material.

As further examples for illustrating suitable ways in which the invention may be applied to the processing of various raw-materials the following may be stated, in which connection certain useful measures for adjusting the microbiological activity of the sorping substance will also be described.

*Example 1 (Ethanol from weak raw-material solutions)*

Waste sulfite liquor prepared in the conventional way by de-gassing and neutralizing, and containing from 0.2 up to 4 per cent fermentable sugar is adjusted to a pH of 4 to 7, and a certain quantity of yeast added which takes up ("sorps") the sugar from the solution. If the sorption is carried out in one step, about 20 to 60 kilograms of yeast (dry content 25 per cent) are suitably used for each kilogram of fermentable sugar present in the liquor. If the sorption is made in several steps a reduced proportion of yeast is of course used in each step. The time of sorption, i. e. the time required for the yeast to take up the sugar from the solution may vary from 1 to 50 minutes. Glucose is generally sufficiently taken up already within 15 minutes of contact between yeast and solution. In the case of galactose about 50 minutes is preferred since the rate of sorption is slower for this substance. The temperature is preferably kept somewhat higher than the optimum temperature of fermenting for the yeast in question, but not so high that this will be permanently injured. Temperatures between 30° and 50° C. are suitable.

Before fermentation has begun to any material degree the yeast is as soon as possible separated from the raw-material solution by some suitable expedient such as centrifugation, filtering, pressing or chemical precipitation, unless the sorption has been made through a porous wall as already described, in which case further separating is superfluous. The yeast is then quickly, after a possible speedy washing in cold water, transferred to a quantity of water or solution of nutritional salts for the yeast of less volume than the corresponding raw-material solution and preferably of higher purity than this.

In the fresh solution the yeast is allowed to ferment at optimal fermenting temperature (25°–40° C.) for ½ up to 48 hours. It is also possible during the fermentation to transfer the yeast one or several times to a fresh solution having less concentration in regard to the product formed or entirely free from this. By letting fresh quantities of yeast, which have taken up sugar from the raw-material solution, repeatedly ferment and give off the transformation product in the same solution the concentration is increased and brought close to the possible limit of production for the yeast employed. This limit is usually around 15 to 22 per cent by volume in regard to ethanol.

The above outlined process is suitable not only for the production of ethanol from weak sugar solutions, such as waste sulfite liquor containing from about 0.2 to 4 per cent fermentable sugar, or whey containing from 1 to 4 per cent lactose, but also for the working up of solutions from hydrolyzed wood or straw containing fermentable sugar in quantities ranging from 0.2 up to as much as 20 per cent by weight.

*Example 2 (Multiple-step sorption)*

Waste sulfite liquor of the same kind, temperature and pH as in Example 1 is suitably continuously conveyed to a container in which it is mixed with yeast to a concentration corresponding to about 2 per cent by weight of yeast calculated as dry and allowed to remain there for about 5 to 10 minutes. After this the liquor is separated, suitably continuously, e. g. by centrifugation, from the yeast and pumped to another container in which it is again mixed with yeast at about the same temperature. This is repeated several times and the last time the period of sorption is suitably increased to about 50 minutes in order also to bring about a more complete sorption of the galactose present in the liquor.

The liquor which has thus been practically freed from sugar may subsequently be used for the production of lactic and acetic acid by means of suitable microorganisms, using the method of concentration according to the invention. In these instances the remaining pentose and hexose substances serve as raw-material. The remaining solution may, if desired, be evaporated to be used as glue, fuel, etc. in the usual way, after having been utilized for microbiological purposes according to the invention.

The yeast coming from the various sorption containers is, suitably continuously, transferred to the fermenting step, if desired after a quick washing in cold water of 0° to 20° C.

The fermenting may also suitably be made in a series of vats, the volume of liquid being suitably limited to about 10 per cent of the volume of the corresponding raw-material solution (waste sulfite liquor). If the process is continuous the above proportion is computed on the quantity treated per unit of time. One and the same quantity of yeast is step by step in a countercurrent manner transferred to solutions of decreasing alcohol content until a last step using an alcohol-free solution. The temperature during the fermenting should be about 30° C. Nutritional salts for the yeast may be added to either the raw-material solution or the subsequent fermenting solution or to both.

Before re-using the yeast it may, if desired, be more or less inactivated in regard to its fermenting power without however lowering its faculty of sorping or taking up the substance to be processed. This may be effected by known expedients for instance by means of catalyst-poisons, anaesthetics, by cold or heat shock or in some other suitable way. The re-activation of the yeast after sorption may in such cases also be made by known means. If the inactivation has for instance been made by means of silver nitrate the reactivation may be effected with hydrogen sulfide. Chloroform, toluene, fluorides and other substances known to be effective as inactivators may after use be removed from the yeast or rendered ineffective e. g. by known precipitating re-agents which thus serve as re-activators.

Example 3 (Two-stage system)

The 100 metric tons of de-gassed, neutralized waste sulfite liquor, containing 88 tons of water and 12 tons of dry substance, of which about 2.2 tons consist of fermentable sugar, are added about 22 tons of yeast, containing 16.5 tons of water and 5.5 tons of dry yeast substance. The total batch is thus 122 tons having a concentration of 4.5 per cent yeast computed as dry. After 15 minutes at 50° C., during which time the pH is kept between 4 and 7, the yeast is separated from the liquid by centrifugation, if desired followed by a quick treatment in filter-press.

The centrifugation yields on the one hand 85 tons of liquor from which greater part of the sugar is removed, and on the other hand 36.6 tons of yeast-sludge composed of 5.5 tons of dry yeast substance, about 1.6 tons of sorped fermentable sugar, 1.4 tons of other dry substance, and 28 tons of water.

To the liquor, still containing about 0.6 ton of sugar, are added 2 tons of yeast (containing 1.5 tons of water and 0.5 ton of dry yeast). This yeast may suitably have been adapted to galactose or consist of a special galactose fermenting kind. This second sorption may be allowed to proceed for about 50 minutes since galactose is more slowly taken up, at least by ordinary yeast.

By centrifugation it is possible to separate off 3 tons of yeast-sludge containing 0.5 ton of dry yeast substance, 0.2 ton other dry substances and 2.4 tons of water.

The two batches of yeast-sludge thus obtained, totally comprising 1.8 tons of fermentable sugar, are united and allowed to pass through fermenting vats according to the "counter-current" principle as previously outlined. In this way it is possible to bring the concentration of alcohol in the product solution up to the possible upper limit for the yeast, i. e. to about 14 to 22 per cent by volume, whereas the obtainable maximum concentration would have been only 1.1 per cent by conventional methods. Under certain circumstances it may be suitable to limit the process to a final concentration of say 8 to 10 per cent of alcohol by volume, without in any way deviating from the scope of the invention.

Example 4 (Lactic acid from whey and the like)

Whey or diluted waste milk, containing 0.2 to 5 per cent of lactose, or other carbohydrate waste liquors with a low sugar content (less than 20 per cent) may, in addition to serving as a raw-material for the production of ethanol also be used for making lactic acid and other useful substances. The sorption is made at 30°–55° C. using lactic acid bacteria of suitable kind. The time of sorption may range from 1 to 40 minutes and the process be carried out in one or several steps as outlined in the foregoing examples. The lactic acid bacteria are separated from the main part of the whey and transferred to a lesser quantity of water or aqueous solution in which the formation of lactic acid is allowed to proceed. The fermenting is suitably made in a series of solutions with decreasing concentration as outlined in Examples 1 and 2, in order to reach the possible limit of concentration or pH. Precipitating or neutralizing agents such as lime may be present or be added during fermenting and separating out of the lactic acid from the fermenting substance.

The above outlined procedures according to the invention may be applied in a number of processes involving diluted raw-material solutions. Thus, it is possible to produce lactic acid from waste sulfite liquor, as mentioned in Example 4. It is also possible to produce lactic and acetic acid in this way, for instance from waste sulfite liquor which has first been utilized for making ethanol, as mentioned above. Other substances which may be microbiologically produced according to the principles of the invention are for instance various organic acids, glycerol, vitamins, amino-acids etc. which are formed by micro-organisms.

The above mentioned possible use of inactivating substances for influencing or retarding the fermenting activity of the yeast will permit of a less strict control of the period of sorption, since the fermenting is thus prevented from beginning or proceeding in any material degree so long as the yeast is influenced by the inactivator. It is thus in this way possible to lengthen the period of sorption, and a subsequent quick separation of the microorganisms is not so important. When these have become transferred to the solution in which the fermentation is allowed to proceed they are instead re-activated by known expedients, as intimated in Example 2.

I claim:

1. In the production of soluble fermentation products, the process which comprises sorping the fermentable sugars from an industrial liquor containing the same in small concentration by adding to said liquor a mass of micro-organisms capable of sorping said sugars and also capable of fermenting said sugars, separating said mass of organisms from said liquor after substantial sorption but before any substantial fermentation of said sugars has taken place, adding the mass of organisms with sorped sugars to another liquor having a relatively smaller volume than said first mentioned liquor, whereby the fermentable sugar content of said second liquor becomes greater than that of said first liquor substantially inversely in proportion to the relative volumes of these liquors, then maintaining conditions in said second liquor favorable to fermentation by said micro-organisms and recovering the soluble fermentation products thereby produced.

2. The process of claim 1 wherein said second liquor of smaller volume contains nutrient salts promoting the fermentation of said sugars.

3. The process of claim 1 wherein the industrial liquor is sulfite waste liquor and the micro-organism is yeast.

4. The process of claim 1 wherein the industrial liquor is whey and the microorganism is a lactic acid bacterium.

5. The process of claim 1 including the steps of deactivating said microorganisms prior to the sorption step and reactivating them upon transfer to the liquor in which fermentation takes place.

6. In the manufacture of alcohol by fermentation methods, the process which comprises adding a mass of yeast to a sulfite waste liquor suitable for fermentation in amount sufficient substantially to sorp the fermentable sugars present, separating to separate the yeast from the liquor as soon as sorption has taken place but before any substantial fermentation has occurred, transferring the yeast with sorped sugars to an aqueous liquor having a volume smaller than that of the sulfite waste liquor, fermenting the sugars in the aqueous liquor, separating the yeast from the fermented liquor, adding another batch of yeast containing sorped carbohydrates to the liquor thus transferring additional sugars thereto, fermenting said additional sugars and continuing this procedure until the concentration of alcohol is within the range of from about 8 to 22 per cent by volume, then distilling off the alcohol.

7. In the manufacture of alcohol by fermentation methods, the process which comprises adding a mass of yeast to a sulfite waste liquor which is suitable for fermentation in amount sufficient to sorp the bulk of the fermentable sugars present, the temperature of the sulfite waste liquor being within the range of about 40° to 50° C., separating the yeast from the sulfite waste liquor within a period of from about 5 to 50 minutes before any substantial fermentation has taken place but after sorption of the bulk of the carbohydrates, washing the separated yeast in cold water, transferring the yeast containing sorped carbohydrates to an aqueous liquor of smaller volume than the sulfite waste liquor, substantially free from fermentable sugars but containing nutrient materials adapted to promote fermentation, whereby the sugar content of said aqueous liquor becomes higher than that of said sulfite waste liquor, maintaining the liquor at a temperature of about 30° C. until the sugars present are substantially fermented and separating the alcohol thereby produced.

8. In the manufacture of alcohol by fermentation methods, the process which comprises adding about 2 per cent by weight of yeast, based on the dry yeast content, to a sulfite waste liquor which is suitable for fermentation and at a temperature of from about 40° to 50° C., separating the yeast from the liquor after about 5 to 10 minutes, adding another smaller mass of yeast to the liquor and, after a longer period of sorption not exceeding about 50 minutes, separating the second batch of yeast, transferring the separated batches of yeast containing sorped sugars to an aqueous liquor of smaller volume than the sulfite waste liquor, whereby the sugar content of said aqueous liquor becomes greater than that of said sulfite waste liquor, fermenting said sugars at a temperature of about 30° C. and recovering the alcohol thereby produced.

SIGVARD FRANS AUGUST EKELUND.

REFERENCES CITED

The following references are of record in the file of this patent:

UNITED STATES PATENTS

| Number | Name | Date |
|---|---|---|
| 1,703,272 | Heijkinskjold | Feb. 26, 1921 |
| 1,891,841 | Sak | Dec. 20, 1932 |